United States Patent [19]
Cantrell

[11] Patent Number: 5,927,785
[45] Date of Patent: Jul. 27, 1999

[54] PROTECTIVE LINER FOR CARGO AREAS OF AUTOMOBILES

[76] Inventor: Paul A. Cantrell, 6019 Lancelot Dr., Charlotte, N.C. 28270

[21] Appl. No.: 08/290,213

[22] Filed: Aug. 15, 1994

[51] Int. Cl.⁶ .................................................. B60R 13/01
[52] U.S. Cl. ............................................................. 296/39.1
[58] Field of Search .................................. 296/39.1, 39.2, 296/39.3, 97.23; 105/423; 410/129; 224/539, 540, 541, 542, 543, 544, 403, 404; 220/8

[56] References Cited

U.S. PATENT DOCUMENTS

| | | | |
|---|---|---|---|
| 818,257 | 4/1906 | Kennedy | 296/39.1 X |
| 2,912,137 | 11/1959 | Taylor | 296/39.2 X |
| 4,765,671 | 8/1988 | Allen | 296/39.2 |
| 4,890,874 | 1/1990 | Davis | 296/39.2 |
| 4,893,862 | 1/1990 | Hollenbaugh, Sr. | 296/39.1 |
| 4,944,612 | 7/1990 | Abstetar et al. | 296/39.2 |
| 4,991,899 | 2/1991 | Scott | 296/39.2 |
| 5,110,171 | 5/1992 | Anthony | 296/39.2 |
| 5,419,602 | 5/1995 | VanHoose | 296/39.1 |

OTHER PUBLICATIONS

Herrington catalog, Mid–Summer '94 (cover, information page, and pp. 3, 45, and 53).

*Primary Examiner*—Andrew C. Pike
*Attorney, Agent, or Firm*—Kennedy Covington Lobdell & Hickman, LLP

[57] ABSTRACT

A "universal" liner for protecting the cargo area of sport utility vehicles and the like comprises four liner members selectively assemblable and disassemblable with one another by mating ribs and channels formed in the floor sections and outwardly projecting lips formed in the side wall sections of the liner members to allow them to be overlappingly assembled with one another to varying degrees to adjust the assembled lengthwise and widthwise dimensions of the liner to fit within the cargo area of substantially any such vehicle.

7 Claims, 4 Drawing Sheets

PROTECTIVE LINER FOR CARGO AREAS OF AUTOMOBILES

BACKGROUND OF THE INVENTION

The present invention relates generally to automotive accessories and, more particularly, to devices for placement in a cargo area of an automobile to protect the cargo area when carrying items which can potentially soil or damage the cargo area.

Historically, pickup trucks have been the vehicle of choice for farmers and workmen who have need to carry large, bulky, or heavy cargo on a regular basis, but pickup trucks have limited capacity for carrying passengers. Station wagons have the capacity to carry an equal number of persons as normal passenger automobiles and also provide a larger cargo area than the trunk of a typical passenger vehicle. However, station wagons are characteristically built on a passenger vehicle chassis and, moreover, their cargo areas are still typically rather shallow so that station wagons are generally unsuitable for carrying heavy loads. In more recent years, a hybrid class of personal automobile which combines characteristics of both pickup trucks and station wagons has become increasingly popular. Such automobiles, commonly referred to as sport utility vehicles, provide a fully enclosed body with seating for four or five adults much like a station wagon, but the body typically provides a taller cargo area to provide the capability of carrying larger, bulkier loads and is built on a truck chassis to enable the vehicle to carry much heavier loads than a common station wagon.

Despite the intent of automobile manufacturers that such sport utility vehicles would be usable for many of the same cargo purposes as pickup trucks, manufacturers have typically outfitted the cargo areas of sport utility vehicles with carpeting and similar appointments as are commonly used in station wagons, making many sport utility vehicle owners reluctant to utilize their cargo areas to carry materials which could potentially soil or damage the cargo area, e.g., gravel, sand, straw or pine needle bales, mulches, etc.

Various items have been marketed and others have been proposed to serve as a temporary liner for protecting the cargo area of a sport utility vehicle when utilized to carry such potentially soiling or damaging materials. One such commercially available product is formed of a flexible padded fabric having floor and side panels which are attached to the carpeted interior of the cargo area using hook-and-loop type fasteners. While this product provides protection for the cargo area, its flexible padded fabric material makes it difficult or nearly impossible to shovel bulk cargo such as gravel, sand, mulches, etc., out of the cargo area. Also, since sport utility vehicles of differing manufacturers have varying sizes of cargo areas, the product must be manufactured in a variety of differing models and sizes, which is highly inconvenient to retail establishments which therefore are required to stock the varying models of fabric liners. A competing product comprises a relatively shallow tray to be placed on the floor of a sport utility vehicle's cargo area. Disadvantageously, the shallow nature of the tray limits its capacity for carrying bulk materials without risk of spillage into the cargo area. Also, this product must necessarily be produced in a variety of sizes, thus suffering the same disadvantage as the padded fabric liner described above. Another commercially available product is in the nature of a simple rubber mat placed on the floor of a vehicle cargo area, but this product offers the least protection for the cargo area in that it has no capability for side containment of cargo materials. Moreover, this product also must necessarily be produced in a variety of differing sizes, posing the same inventory problems as the other products described above. Other forms of protective liners for sport utility vehicles are disclosed in U.S. Pat. Nos. 4,765,671; 4,893,862; and 5,110,171, but these products are not known to have been produced commercially.

SUMMARY OF THE INVENTION

It is accordingly an object of the present invention to provide a protective liner for the cargo areas of sport utility vehicles which will be of a substantially "universal" construction adaptable to substantially any size vehicle cargo area, whether the rear seat of the vehicle is positioned up for passenger seating or down for cargo loading, so that only a single model of the present liner need be produced and inventoried by retailers to accommodate the needs of substantially all sport utility vehicle owners, regardless of the manufacturer and model of the vehicle.

Briefly summarized, the present invention accomplishes the foregoing objective by forming a protective liner for automobile cargo areas of at least a pair of liner members each formed of a substantially rigid material and each equipped with a floor section. The floor sections of the respective liner members have respective connection means matable with one another when the floor sections are arranged in overlapping relation. Preferably, the respective connection means are matable in a plurality of dispositions wherein the floor sections overlap with one another to varying extents for selective assembly of the liner members to occupy varying sizes of automobile cargo areas. In the preferred embodiment, the connection means comprises a plurality of parallel ribs formed in the floor section of one liner member and a plurality of parallel channels formed in the floor section of the other liner member, each rib being matable in any of the channels.

In the preferred embodiment, each liner member also comprises a side wall section extending transversely from the floor section and an end wall section also extending transversely from the floor section, with the side and end wall sections abutting one another. When the liner members are connected, the end wall sections are adapted to overlap one another to varying extents corresponding to the extent of overlap of the respective floor sections.

According to another feature of the preferred embodiment, the side and end wall sections of each liner member are foldable relative to its floor section, with the side and end wall sections equipped with respective means for securing them in abutting relation when the liner members are assembled.

It is further preferred that the liner assembly of the present invention be equipped with a removable end wall formed of a pair of end wall members selectively connectable with one another in multiple dispositions overlapping to varying extents. Each end wall member has means by which the overlapping assembly of the end wall members may be selectively mounted to the side wall sections of the liner members to extend transversely therebetween.

As necessary or desirable to provide additional flexibility in configuring the assembly of the liner to accommodate differing sizes of automobile cargo areas, the liner may be equipped with a second pair of auxiliary liner members also formed of substantially rigid material and each having a floor section similar to the first-mentioned pair of liner members. Each auxiliary liner member has respective connection means selectively matable with one another and also with the connection means of the first-mentioned pair of liner members, whereby the four respective liner members may be assembled in the aforementioned multiple dispositions with the first liner members overlapping one another as well as the auxiliary liner members, thereby for selective assembly of the first and auxiliary liner members to occupy varying sizes of automobile cargo areas. Preferably, each of the first and auxiliary liner members in this embodiment comprise a side wall section extending transversely from the floor section with each side wall section having an outwardly projecting lip. The respective lips of the first and auxiliary members slidably engage one another when the liner members are assembled in overlapping relation to guide relative sliding movement of the first and auxiliary liner members toward and away from one another for selectively varying the extent of their overlapping relation.

DETAILED DESCRIPTION OF THE PREFERRED EMBODIMENT

Figure 1:
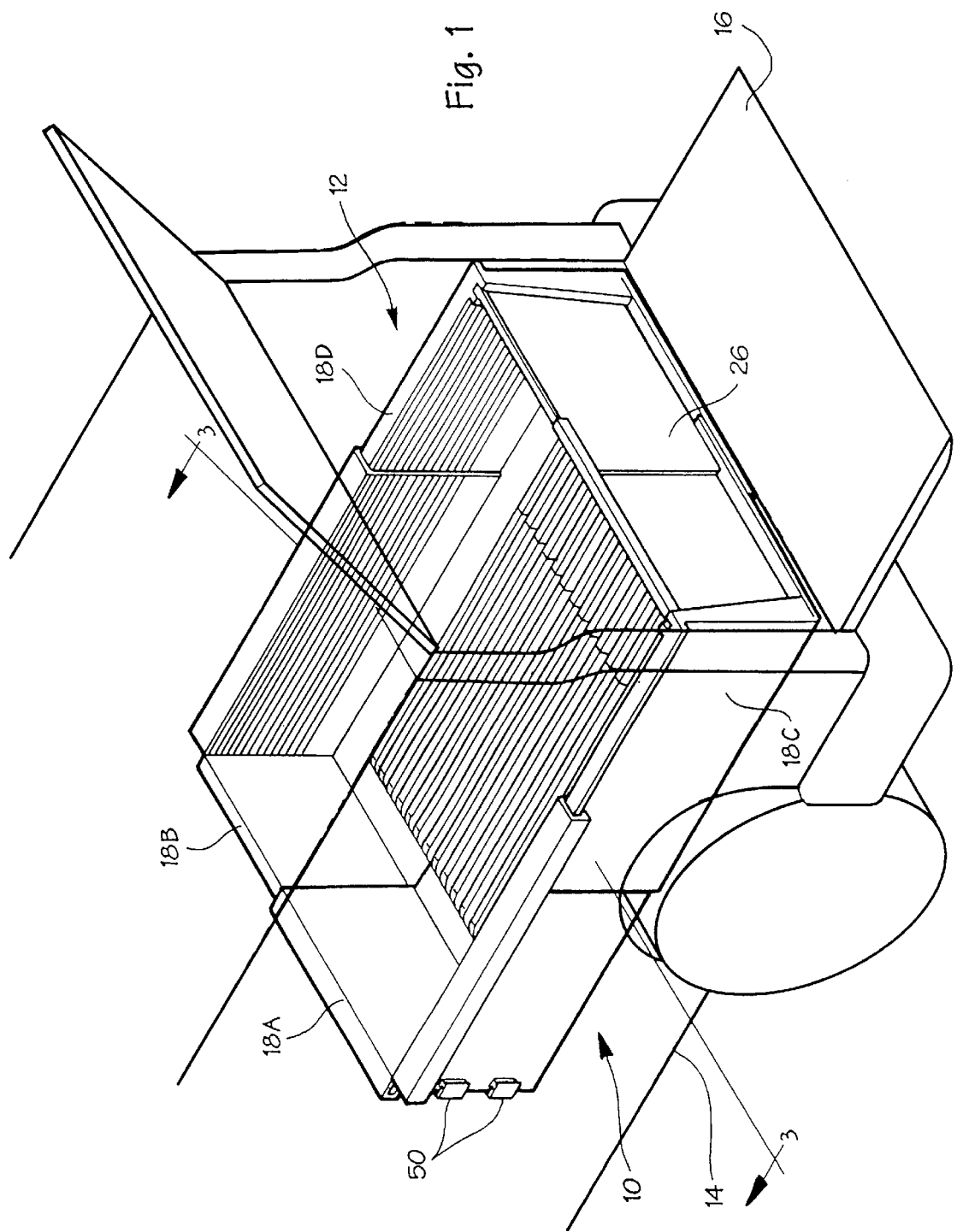
FIG. 1 is a perspective view of one preferred embodiment of the protective liner of the present invention, as assembled and installed in a typical sport utility vehicle.

Referring now to the accompanying drawings and initially to FIG. 1, the protective liner of the present invention is shown generally at 10, as fully assembled and installed in the rear cargo area 12 of a conventional sport utility vehicle 14. The vehicle 14 is only generically shown to be representative of any of a variety of conventional sport utility vehicles, such as the Jeep Cherokee, Chevrolet Blazer, Ford Bronco, and various other like vehicles. Typically, a sport utility vehicle such as the vehicle 14 will have driver and passenger front bucket seats (not shown) and a bench-type rear seat (also not shown) behind which the cargo area 12 is disposed to be accessible through a rear door or tailgate 16 forming a unitary compartment. The cargo area 14 typically has a substantially flat floor and, in many such vehicles, the seat back of the rear bench seat may be folded forwardly and downwardly to be substantially flush with the floor of the cargo area 12 to extend and enlarge the overall cargo area.

As those persons skilled in the art will recognize, the size of the cargo area 12, i.e., its lateral (widthwise) and longitudinal (lengthwise) dimensions, both with the rear seat upwardly in its use position and downwardly in its cargo position, will vary from one manufacturer's vehicle to another. The liner 10 of the present invention is intended to provide a substantially "universal" liner which may be selectively assembled in varying configurations to fit the cargo area 12 of substantially any conventional utility vehicle, as well as similar vehicles such as station wagons, vans, or minivans. For this purpose, the liner 10 comprises at least two and preferably four selectively assemblable and disassemblable liner members 18A,18B,18C,18D.

Figure 2:
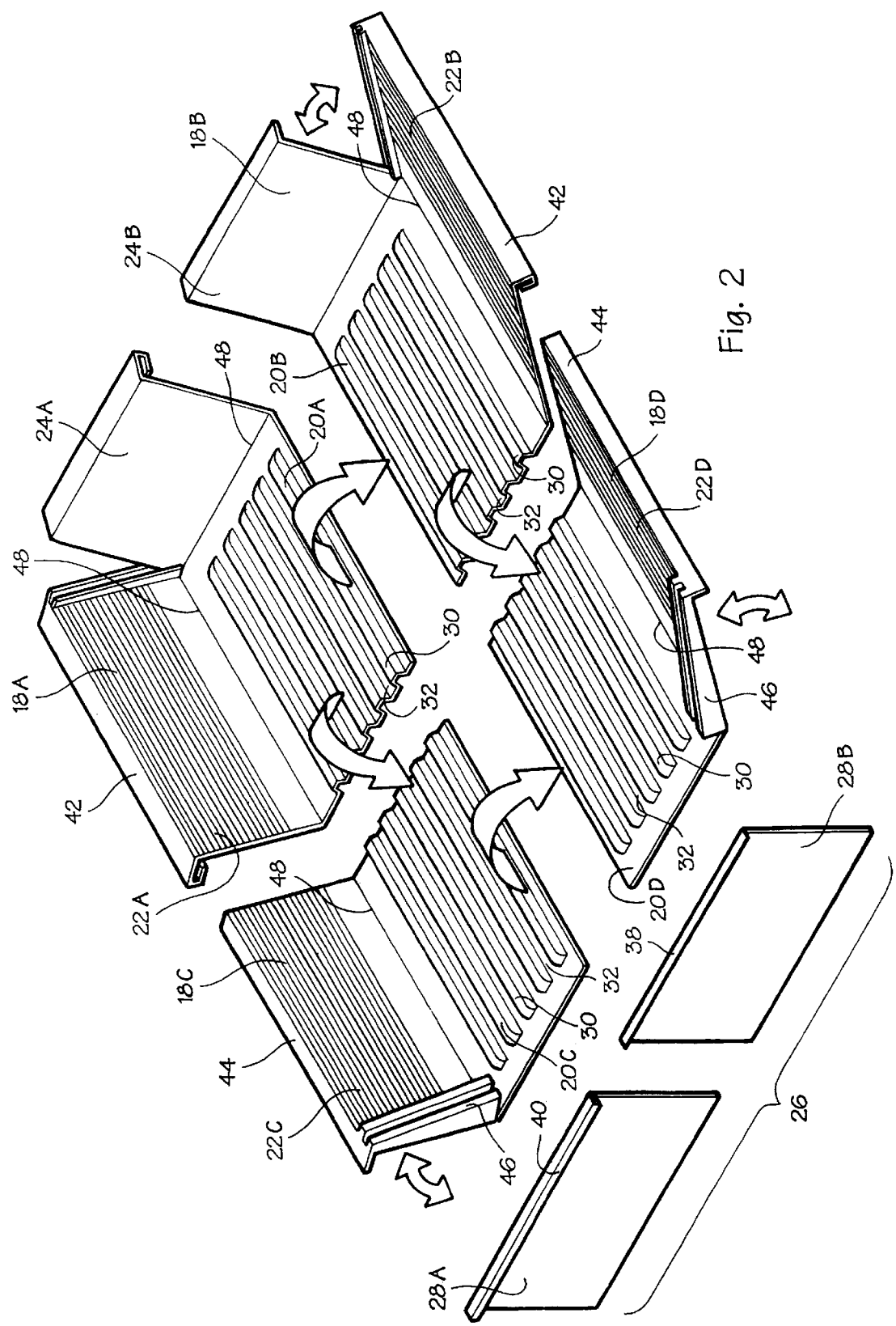
FIG. 2 is an exploded perspective view of the protective liner of FIG. 1.

As best seen in FIG. 2, the front pair of liner members 18A,18B are formed as mirror images of one another, each having a floor section 20A,20B, a side wall section 22A, 22B, respectively, extending coextensively from the outwardmost side edge of the respective floor section 20A,20B, and an end wall section 24A,24B, respectively, extending coextensively from the respective forward end edge of the associated floor section 20A,20B.

Similarly, the rear liner members 18C,18D are formed as mirror images of one another, each having a respective side wall section 22C,22D extending coextensively from the respective outward side edges of the floor sections 20C,20D of the associated liner members 18C,18D. A detachable rear end wall assembly 26 is formed of two end wall members 28A,28B connectable with one another.

According to the present invention, the floor sections 20A,20B,20C,20D are of a corrugated configuration in lateral cross-section formed by a series of alternating parallel ribs 30 and intervening channels 32. Each liner member 18A,18B,18C,18D and each end wall member 28A,28B is formed of a substantially rigid material, such as any suitable high density moldable thermoplastic material, e.g., polyethylene, which provides sturdy, reliable resistance to cutting, puncture, abrasion, and other damage from various cargo materials, while also providing a sufficient degree of flexibility and resiliency to permit the respective ribs 30 and channels 32 of the floor sections of the respective liner members 18A,18B,18C, 18D to fit securely and matingly into one another.

Figure 3:
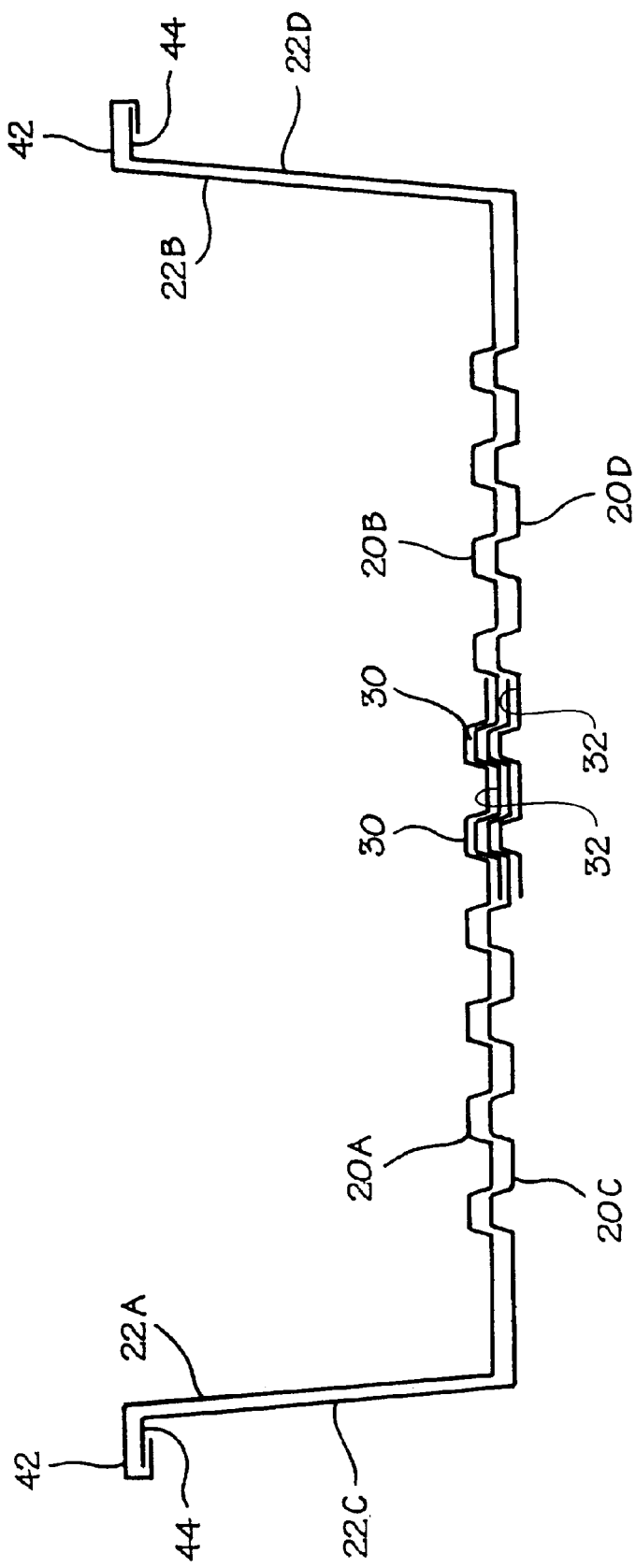
FIG. 3 is a schematic vertical cross-sectional view through the protective liner of FIG. 1, taken along line 3—3 thereof.

In this manner, the respective liner members 18A,18B, 18C, 18D may be assembled with one another to configure the liner 10 of differing overall widthwise and lengthwise dimensions. Specifically, the front liner members 18A,18B may be assembled by overlapping their respective floor and end wall sections 20A,20B and 24A,24B to accommodate a particular dimension of cargo area 12 and, then, nesting the respective ribs 30 and channels 32 in the overlapping extents of the floor sections to secure the liner members 18A,18B together. The rear liner members 18C,18D are similarly assembled together with their floor sections 20C,20D overlapping one another and with the respective overlapping ribs 30 and channels 32 nested securely. The assembled front and rear pairs of liner members are then respectively nested to overlap with one another lengthwise to the extent necessary to accommodate the lengthwise dimension of a vehicle cargo area and the respective ribs 30 and channels 32 of the overlapping floor sections 20A,20B, 20C,20D of the liner members 18A,18B,18C,18D are nested interfittingly together as well to assemble the four liner members together (see FIG. 3).

To facilitate the lengthwise adjustment of the overlapping extent of the front pair of liner members 18A,18B with the rear pair of liner members 18C,18D, the respective side wall sections 22A,22B of the front liner members are formed at their free outer edges with an outwardly projecting flange 42 and the side wall sections 22C,22D of the rear liner members 18C,18D are similarly formed with a slightly smaller outwardly projecting flange 44 configured to nest within the flanges 42 of the front liner members 18A,18B. In this manner, when the front and rear pairs of liner members 18A,18B and 18C,18D are assembled with one another in overlapping relation with their respective flanges 42,44 assembled, the front and rear liner members may be slidably moved toward and away from another to adjust the extent of their overlapping relation and, in turn, the overall lengthwise dimension of the assembled liner 10.

The end wall members 28A,28B are likewise assemblable with one another to varying overlapping extents by slidably interfitting respective flanges 38,40 at their upper edges, to provide the rear end wall assembly 26 with substantially the same transverse dimension as the dimension of the liner 10 between the assembled side wall sections 22C,22D of the rear liner members 18C,18D. The side wall sections 22C, 22D are formed adjacent their respective rearward ends with inwardly projecting ribs 46 configured to slidably receive the outward end edges of the end wall members 28A,28B to permit the rear end wall assembly 26 to be mounted to and demounted from a position connected to and extending transversely between the rear side wall sections 22C,22D.

As depicted in FIG. 2, each liner member 18A,18B,18C, 18D may be provided with a score line or other fold line 48 along the juncture of their respective floor, side, and end wall sections, to enable each liner member to be folded into a relatively flat configuration when not in use, thereby to simplify storage and transportation of the liner 10 and minimize the overall space required for storage. Of course, those persons skilled in the art will recognize that the liner members 18A,18B,18C,18D may also be configured with their respective floor, side, and end wall sections fixed in their desired disposition for use, without departing from the substance and scope of the present invention and, particularly, without inhibiting or affecting the adjusting assemblability of the liner members into differing widthwise and lengthwise assembled dimensions.

Figure 4:
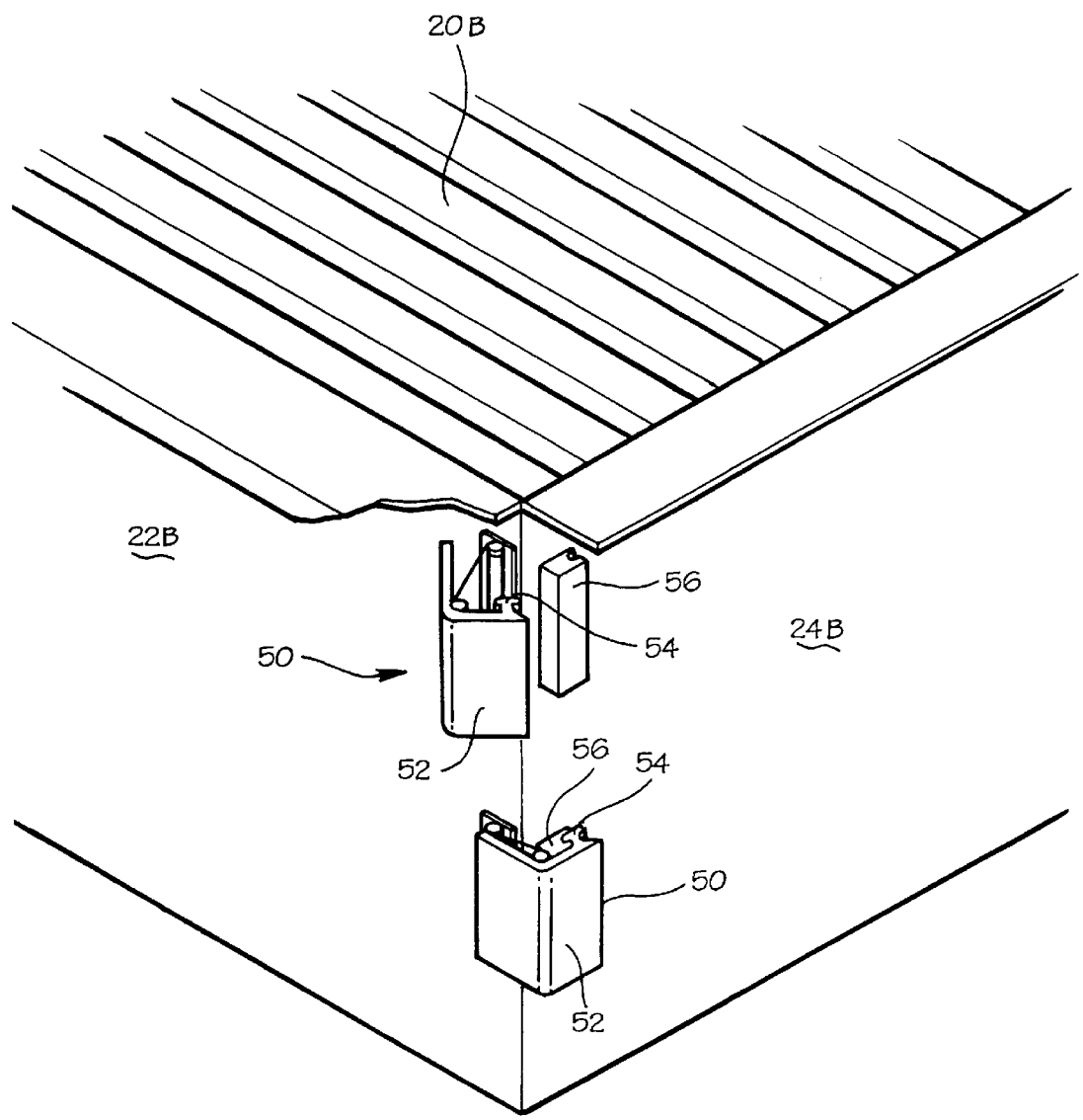
FIG. 4 is a perspective view of the latching arrangement by which the end and side wall sections of the front liner members are secured.

In embodiments having the side and end wall sections foldable relative to the respective floor sections of the liner members, appropriate means must be provided to enable selective connection and disconnection of the respective side and end wall sections 22A,22B and 24A,24B of the front liner members 18A,18B into and out of abutting disposition for use. As best seen in FIG. 4, the abutting edges of the respective side and end wall sections are formed with an appropriate latching mechanism, indicated generally at 50, for this purpose. Substantially any form of latching mechanism may be utilized, the latching mechanism 50 shown merely being representative of an exemplary form of latching mechanism. The latching mechanism 50 basically comprises a first latching member 52 pivotably mounted to one of the side or end wall sections 22A,22B or 24A,24B, the latching member 52 having a gripping flange 54 at its outer free end. The other of the side or end wall sections 22A,22B or 24A,24B is formed with a fixed projecting wall portion 56 positioned to be engaged by the gripping flange 54 of the latching member when the side and end wall sections 22A,24A or 22B,24B are abutted with one another. Preferably, each liner member 18A,18B is equipped with two of the latching member 50 along its respective abutting side and end wall sections to optimize the security of the connection therebetween when the liner members 18A,18B are assembled for use. The side wall sections 22A,22B may be formed adjacent their respective forward ends with inwardly projecting ribs 58 (FIG. 2) to receive the outward end edges of the end wall sections 24A,24B when the side and end wall sections 22A,22B,24A,24B are latched together.

It will therefore be recognized and understood by those persons skilled in the art that the liner 10 of the present invention offers the substantial advantage over the prior art of being assemblable into a variety of differing widthwise and lengthwise dimensions to readily fit within the cargo area of substantially any sport utility vehicle, station wagon, or other like vehicle having a generally rectangular cargo area, to provide protection for the cargo area when used to carry cargo items which could potentially damage the area. By the provision of mating ribs and channels in the constituent liner members, the liner 10 is readily assemblable without the use of special tools. In embodiments wherein the side and end wall sections of the liner members are foldable, the liner members may be easily folded into a flattened condition and stacked with one another and with the end wall members for relatively compact storage and transportation.

It will therefore be readily understood by those persons skilled in the art that the present invention is susceptible of a broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements, the present invention being limited only by the claims appended hereto and the equivalents thereof.

I claim:

1. In combination, an automobile having a cargo area and a protective liner disposed in the cargo area, said protective liner comprising a pair of first liner members formed of a substantially rigid material and a pair of auxiliary liner members formed of a substantially rigid material, each said first and auxiliary liner member having a floor section, said floor sections being selectively assemblable and disassemblable with one another in a plurality of dispositions wherein said floor sections of said first liner members overlap one another and overlap said floor sections of said auxiliary liner members to varying extents for selective assembly of said first and auxiliary liner members to occupy varying sizes of the automobile cargo area, and each said first and auxiliary liner member further comprising a side wall section extending transversely from said floor section thereof, each side wall section comprising an outwardly projecting lip, the respective lips of said first and auxiliary liner members slidably engaging one another when said liner members are assembled in overlapping relation to guide relative sliding movement of said first and auxiliary liner members toward and away from one another for selectively varying the extent of overlapping relation.

2. The combination according to claim 1, wherein each said first liner member further comprises at least one wall section extending transversely from said floor section thereof.

3. The combination according to claim 1, wherein each said first liner member further comprises an end wall section extending transversely from said floor section thereof, said side and end wall sections abutting one another.

4. The combination according to claim 3, wherein said end wall sections of said first liner members are adapted to overlap one another to varying extents corresponding to the extent of overlapping of said floor sections.

5. The combination according to claim 3, wherein said side and end wall sections of each said first liner member are foldable relative to said floor section thereof, said side and end wall sections having respective means for securing them together in abutting relation.

6. The combination according to claim 3, further comprising means on each said end wall member and each said side wall section of said first liner members for selectively mounting said end wall members of said first liner members to said side wall sections of said first liner members to extend transversely therebetween.

7. A protective liner for cargo areas of automobiles, said liner comprising a pair of first liner members formed of a substantially rigid material and a pair of auxiliary liner members formed of a substantially rigid material, each said first and said auxiliary liner member having a floor section, said floor sections of said first and said auxiliary liner members having respective connection means selectively matable with one another in a plurality of dispositions wherein said floor sections of said first liner member overlap one another and overlap said floor sections of said auxiliary liner members to varying extents for selective assembly of said first and said auxiliary liner members to occupy varying sizes of the automobile cargo areas, and each said first and auxiliary liner member further comprising a side wall section extending transversely from said floor section, each side wall section comprising an outwardly projecting lip, the respective lips of said first and auxiliary liner members slidably engaging one another when said liner members are assembled in overlapping relation to guide relative sliding movement of said first and auxiliary liner members toward and away from one another for selectively varying the extent of overlapping relation.

\* \* \* \* \*